United States Patent [19]
Franklin et al.

[11] Patent Number: 5,935,548
[45] Date of Patent: Aug. 10, 1999

[54] METHOD FOR REMOVING HYDROGEN SULFIDE FROM MOLTEN SULFUR

[75] Inventors: David A. Franklin, Olathe; Nathan A. Hatcher, Shawnee, both of Kans.

[73] Assignee: Black & Veatch Pritchard, Inc., Overland Park, Kans.

[21] Appl. No.: 09/038,742

[22] Filed: Mar. 11, 1998

[51] Int. Cl.[6] .................................................. C01B 17/02
[52] U.S. Cl. ...................... 423/578.1; 423/567.1
[58] Field of Search ............................. 423/578.1, 567.1

[56] References Cited

U.S. PATENT DOCUMENTS

| | | | |
|---|---|---|---|
| 4,002,728 | 1/1977 | DeMay | 423/578 R |
| 4,423,025 | 12/1983 | Ledford et al. | 423/578 R |
| 4,729,887 | 3/1988 | Pendergraft | 423/564 |
| 4,844,720 | 7/1989 | Pendergraft et al. | 55/73 |
| 5,632,967 | 5/1997 | Nasato | 423/578.1 |

FOREIGN PATENT DOCUMENTS

| | | | |
|---|---|---|---|
| 1002730 | 1/1977 | Canada. | |
| 284 210 A5 | 11/1990 | Germany | 423/567.1 |
| 51-35693 | 3/1976 | Japan | 423/578.1 |

OTHER PUBLICATIONS

Perry et al. (editors) *Chemical Engineers Handbook* 5th Edition; McGraw Hill Book Co. USA; ISBN 0–07–049478–9 pp. 6–15 and 6–29 to 6–32, 1973.

*Primary Examiner*—Gary P. Straub
*Assistant Examiner*—Timothy C Vanoy
*Attorney, Agent, or Firm*—F. Lindsey Scott

[57] ABSTRACT

A method and apparatus for removing hydrogen sulfide from a molten sulfur stream containing hydrogen sulfide and hydrogen polysulfides by mixing the molten sulfur stream with a degassed molten sulfur stream in an eductor to form a mixture, contacting the mixture with a finely dispersed gaseous oxidant stream, separating hydrogen sulfide from the mixture and recovering molten sulfur having a reduced hydrogen sulfide content.

13 Claims, 3 Drawing Sheets

METHOD FOR REMOVING HYDROGEN SULFIDE FROM MOLTEN SULFUR

FIELD OF THE INVENTION

This invention relates to a method and apparatus for removing hydrogen sulfide from molten sulfur produced by sulfur recovery processes such as the Claus process by mixing the raw molten sulfur with degassed sulfur and air with vigorous agitation.

BRIEF DESCRIPTION OF THE PRIOR ART

Sulfur, as produced by sulfur recovery processes such as the Claus process, typically contains from about 200 to about 500 parts per million by weight (ppmw) hydrogen sulfide. The hydrogen sulfide may be contained in the molten sulfur as hydrogen sulfide or as hydrogen polysulfides. The dissolved hydrogen sulfide separates from the sulfur readily but the hydrogen sulfide present as hydrogen polysulfides must first decompose back to hydrogen sulfide and elemental sulfur before the hydrogen sulfide in the hydrogen polysulfides can be removed.

It is desirable that sulfur be degassed because of the toxicity, explosiveness and corrosion considerations of hydrogen sulfide. Hydrogen sulfide is lethal at 600 parts per million volume and it is explosive at roughly 3.5 volume percent in air. Both of these conditions are of concern, especially during loading and unloading. The head space in a tank or truck can exceed toxicity and explosive limits if the sulfur is not degassed. Further, solid sulfur friability generally increases with higher hydrogen sulfide content, resulting in more sulfur fines and dust generation during handling. Degassing liquid sulfur has therefore become a topic of prime concern to sulfur producers as a result of increased public and market pressures to produce an odor-free, low hydrogen sulfide product. Ten to fifteen ppmw has come to be considered a good target concentration for hydrogen sulfide in liquid sulfur to satisfy these considerations.

As noted above, sulfur produced in sulfur recovery units typically contains from about 200 to about 500 ppmw $H_2S$ depending upon sulfur recovery unit operating conditions. More hydrogen sulfide is present at higher temperatures than at lower temperatures. This apparent anomaly of physical absorption is attributed to the formation of hydrogen polysulfides which is considered to increase under conditions of increasing temperature.

During storage and subsequent handling of the sulfur, the hydrogen polysulfide components will decompose as equilibrium is achieved at lower temperatures to result in the formation of dissolved hydrogen sulfide in liquid sulfur which can then evolve into the gaseous phase. Various processes have been used to remove hydrogen sulfide from molten sulfur. Some of these processes have used liquid catalysts injected to promote the decomposition of hydrogen polysulfide directly. Frequently, these processes have required additional residence time versus gas sparging processes due to the poor mass transfer of hydrogen sulfide into the gaseous phase. In view of the continued requirement for hydrogen sulfide removal from molten sulfur, a continuing effort has been directed to the development of improved methods and systems for the removal of hydrogen sulfide and hydrogen polysulfides from molten sulfur economically and effectively.

SUMMARY OF THE INVENTION

According to the present invention, hydrogen sulfide is removed from a molten sulfur steam containing at least one of hydrogen sulfide and hydrogen polysulfides by mixing the molten sulfur stream with a degassed molten sulfur in an eductor to form a mixture, contacting the mixture with a finely dispersed gaseous oxidant, separating hydrogen sulfide from the mixture and recovering molten sulfur having a reduced hydrogen sulfide content.

The present invention further comprises an apparatus for removing hydrogen sulfide from a raw liquid sulfur containing at least one of hydrogen sulfide and hydrogen polysulfides comprising a vessel including an inlet for the raw liquid sulfur and an outlet for an at least partially degassed liquid sulfur; a degassed liquid sulfur inlet in the vessel comprising an eductor adapted to mix at least one of an oxidant stream selected from oxygen-enriched air and air, partially degassed liquid sulfur and degassed liquid sulfur with the raw sulfur to form a mixture and discharge the mixture into the vessel; and a degassed liquid sulfur outlet from the vessel.

DESCRIPTION OF PREFERRED EMBODIMENTS

In the discussion of the Figures, the same or similar numbers will be used throughout to refer to the same or similar components. Not all pumps, valves, heat exchangers and the like necessary for the performance of the process have been shown in the interest of conciseness.

Figure 1:
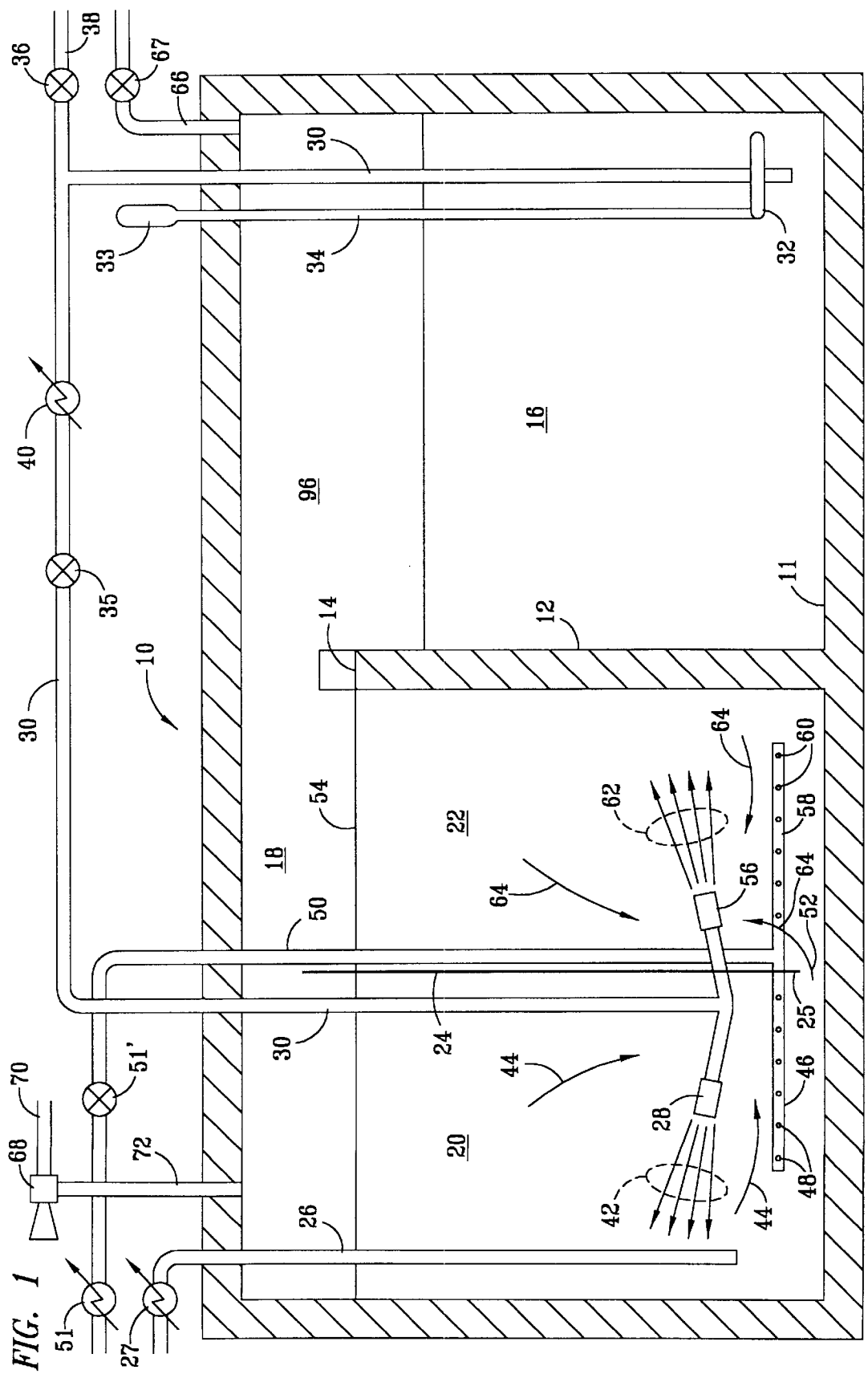
FIG. 1 is a schematic diagram of an embodiment of the present invention.

In FIG. 1 an enclosure 10 having a bottom 11 and including a partition 12 is shown. Partition 12 includes a weir 14 to permit the overflow of liquid sulfur into a degassed sulfur storage section 16. A sulfur degassing section 18 is included in tank 10 and includes a first stage degassing section 20 and a second stage degassing section 22. First stage degassing section 20 and second stage degassing section 22 are divided by a partition 24 which includes a passageway 52 beneath a bottom 25 of partition 24. Raw sulfur containing at least one of hydrogen sulfide and hydrogen polysulfide is passed to first stage degassing section 20 via a line 26. Line 26 may include a heat exchanger 27 for adjustment of the temperature of the raw sulfur to a desired temperature. Alternatively, degassing section 20 may include a heat exchanger (not shown) to adjust the temperature of the raw sulfur. An eductor 28 is positioned in first stage degassing section 20 and is supplied with degassed sulfur via a line 30. As the degassed sulfur is passed through eductor 28, sulfur from first section 20 is drawn into eductor 28 and ejected as a mixture of raw or partially degassed sulfur from section 20 with the degassed sulfur. The mixture of degassed sulfur and sulfur from section 20 is ejected into first stage degassing section 20, as shown, above a gas sparger 46 which includes openings 48 for the dispersal of a gas in finely divided bubble form into the molten sulfur in first stage degassing section 20. This finely dispersed gas, which is typically air, oxygen-enriched air, other suitable oxidants such as sulfur dioxide or the like, but is preferably air (referred to herein as air), passes upwardly through section 20 and the mixture ejected from eductor 28 as shown by arrows 42. Raw sulfur is drawn into eductor 28, as shown by arrows 44, and the sulfur mixture is discharged, as shown by arrows 42. The net result is very complete mechanical mixing of the raw sulfur with the degassed sulfur supplied through line 30. Line 30 also includes a heat exchanger 40. Heat exchangers 27 and 40 may be used to control the temperature of the molten sulfur passed to first stage degassing section 20. Further, a heat exchanger 51 may be placed in an air line 50 used to supply air to gas sparger 46. Desirably, the air flow is controlled by a valve 51 and the air is heated to a temperature above about 238° F. It is desirable that the temperature of the sulfur be controlled within a range from about 245° F. to about 315° F.

Partially degassed sulfur passes through passageway 52 into second stage degassing section 22. A second eductor 56 is positioned in section 22 and is supplied with degassed sulfur via line 30. Air is supplied to a gas sparger 58 and finely dispersed bubbles are emitted from openings 60 as discussed in conjunction with section 20. As discussed in conjunction with section 20, eductor 50 produces a mixture of partially degassed molten sulfur from section 22 with degassed sulfur. The mixture is discharged, as shown by arrows 62. The partially degassed sulfur is drawn into eductor 56, as shown by arrows 64. As the result of the admission of additional quantities of raw sulfur to section 20 and the injection of degassed sulfur and the admission of partially degassed sulfur into section 22, a sulfur level is maintained sufficient to cause substantially degassed sulfur to pass over weir 14 in partition 12 into a degassed sulfur storage section 16. A pump 32 driven by a motor 33 via a shaft 34 is used to pump molten degassed sulfur from storage section 16 via line 30 to a sulfur product line 38 or to eductors 28 and 56. While not shown, separate valved lines may be used to carry sulfur from line 30 to each of eductors 28 and 56 so that the flow rate of molten sulfur to each eductor can be separately regulated. Flow through line 30 is regulated by a valve 35 with flow through line 38 being regulated by a valve 36. A head space 96 is provided above first stage 20, second stage 22 and sulfur storage section 16. Air, or other suitable gas, is admitted through an inlet 66 and a valve 67 into enclosure 10 and is withdrawn via a line 72 by an eductor 68 which receives a flow of a suitable gas, such as steam, compressed air and the like, through a line 70 to educt hydrogen sulfide from tank 10. Other means of removing the hydrogen sulfide, such as a pump or the use of a pressurized gas flow through line 66, may be used to remove hydrogen sulfide from tank 10. The hydrogen sulfide may be passed to further treatment for sulfur recovery and the like.

In the operation of the enclosure shown in FIG. 1, raw sulfur containing hydrogen sulfide, hydrogen polysulfides, or both, is introduced into first section 20 where it is adjusted to a suitable temperature, typically from about 245 to about 315° F., by the heat exchangers 27 and 40 and thereafter mixed with degassed sulfur which is also adjusted to a selected temperature in heat exchanger 40 so that the vigorous mixing of the raw sulfur with the degassed sulfur in section 20 takes place at a desired temperature above a finely divided stream of air. In the first degassing section, hydrogen sulfide is stripped from the molten sulfur by a combination of gas flow and oxidation. Hydrogen sulfide liberated from the solution is diluted and the sparging air reduces the $H_2S$ partial pressure in the gas phase and provides a driving force for the conversion of hydrogen sulfide in a liquid phase to hydrogen sulfide in a gaseous phase. Further, the oxidation contributes to the oxidation of hydrogen sulfide to sulfur and water. The hydrogen polysulfide is converted to hydrogen sulfide and sulfur. A small portion of the hydrogen sulfide may be over oxidized to sulfur dioxide and it is believed that the Claus reaction may occur to some extent, which will result in conversion of quantities of hydrogen sulfide to sulfur and water by reaction with the sulfur dioxide. The net result of these reactions is that the hydrogen sulfide pressure in the gas phase is further lowered by producing elemental sulfur which produces an additional driving force for degassing.

At temperatures below 245° F., sulfur may solidify. The temperature is desirably below about 315° F. to optimize the degassing reactions and avoid high viscosity and plugging potential as the hydrogen sulfide is released from the solution. These reactions occur in first stage 20 and second stage 22. The degassed sulfur, after treatment, is then stored in degassed sulfur storage 16 and ultimately removed as a product. The recycled degassed sulfur is removed from storage 16 and serves to regulate the temperature in sections 20 and 22 and provide a motive force to mix and agitate the raw sulfur to facilitate the removal of hydrogen sulfide and hydrogen polysulfides therefrom.

Figure 2:
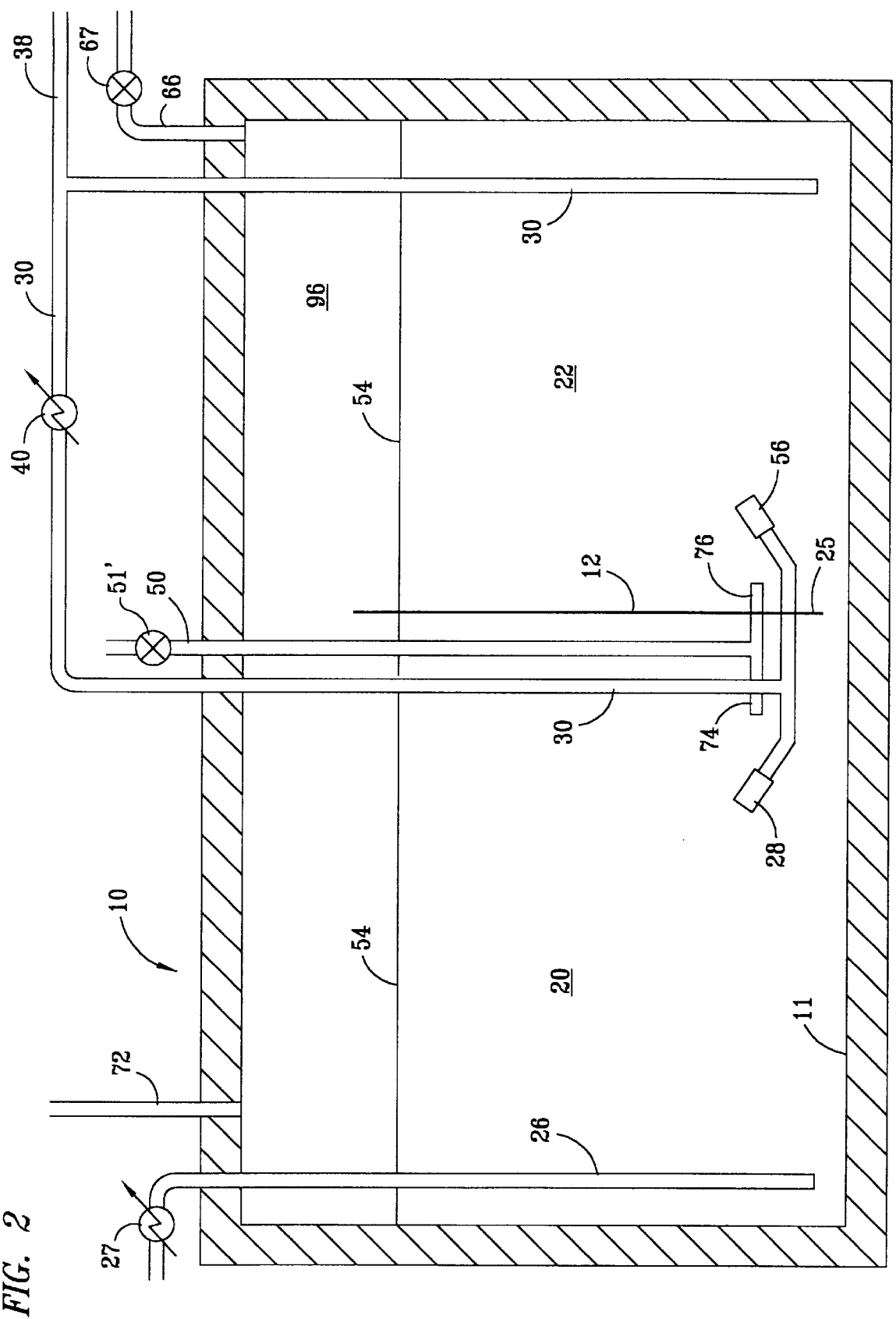
FIG. 2 is a schematic diagram of an alternate embodiment of the present invention.

In FIG. 2 an alternate embodiment of the present invention is shown. In this embodiment the recycled sulfur product is drawn from a second stage 22. Enclosure 10, as shown in FIG. 2, includes a first degassing section 20 and a second degassing section 22 and functions in substantially the same way as discussed in conjunction with sulfur degassing section 18 in FIG. 1. The enclosure in FIG. 2 does not include a gas sparger. Alternatively, an air line 50 including a valve 51 and which may include a heat exchanger (not shown) is used to supply air to the inlet of eductors 28 and 56. The air may be released in the vicinity of the inlet to the eductors or the air lines may extend into the degassed sulfur lines extending from line 30. In either event, the degassed sulfur withdrawn from section 22 via line 30 is passed to eductors 28 and 56 as well as to product via line 38. A head space 96 is supplied with a flow of a suitable gas through an inlet line 66 and a valve 67 with hydrogen sulfide being recovered through a line 72. In the operation of enclosure 10 as shown in FIG. 2, raw sulfur containing hydrogen sulfide or hydrogen polysulfide is passed via line 26 into first section 20 where it is vigorously mixed with an oxidant gas such as air, oxygen enriched air, sulfur dioxide and the like and with degassed sulfur in eductor 28. The mixture ejected from eductor 28 contains air, degassed sulfur and raw molten sulfur. This vigorously ejected mixture is effective to mix the solution in first section 20 and to achieve intimate contact between the raw sulfur and the oxidizing gas. As a result, the sulfur is at least partially degassed in first section 20. The sulfur then moves beneath lower end 25 of partition 12 into second section 22 where it is at least partially drawn into the eductor inlet of eductor 56 and similarly treated by mixture with a degassed sulfur stream and air to vigorously mix the degassed sulfur in second section 22. Degassed sulfur is withdrawn from a lower portion of second section 22 via line 30 and used for recycle or passed to use as a product.

Figures 3, 4:
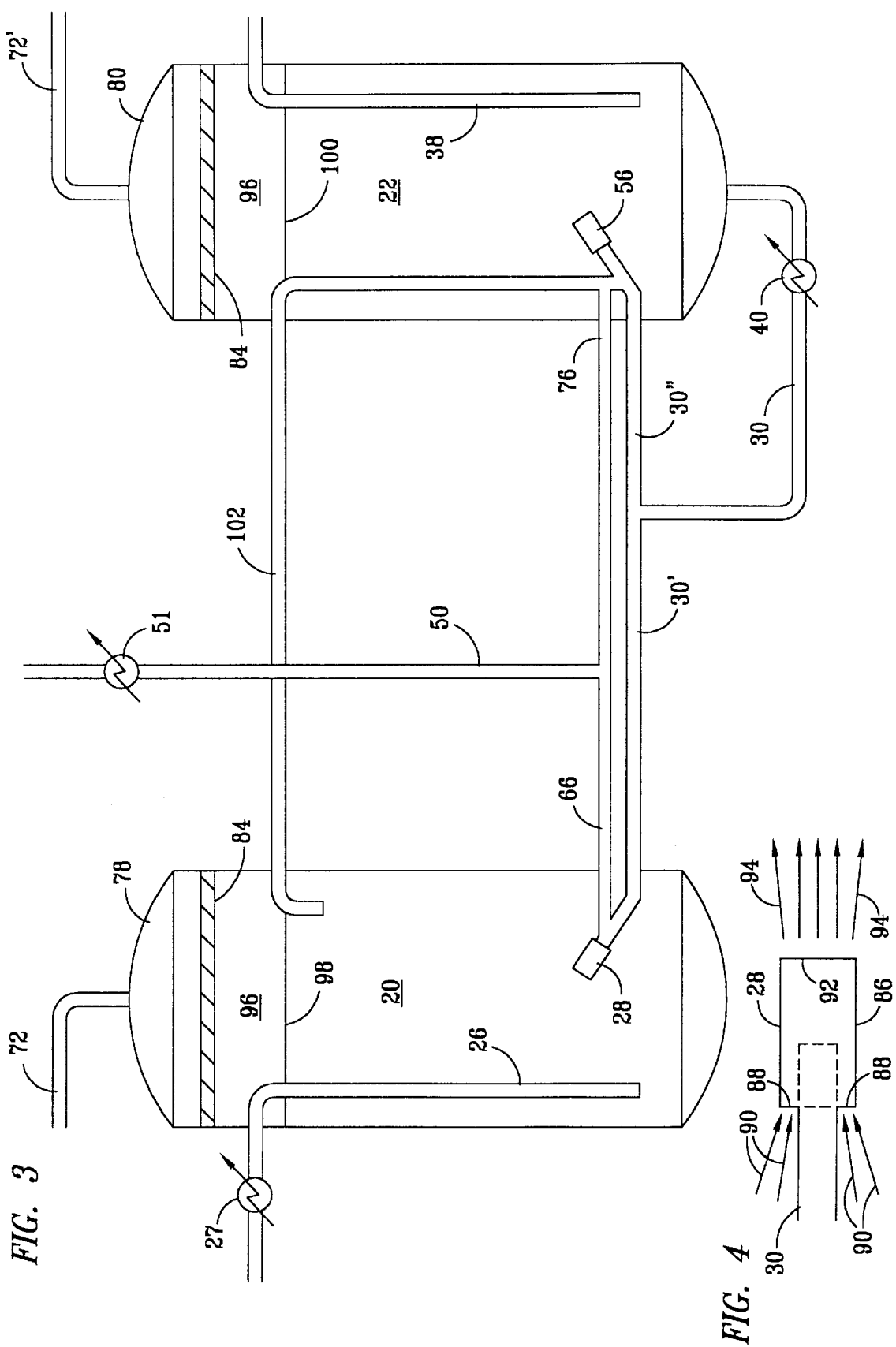
FIG. 3 is a further embodiment of the present invention wherein two vessels are used.
FIG. 4 is a schematic diagram of a nozzle useful in the method and apparatus of the present invention.

In FIG. 3 a system comprising two tanks is used. The first tank 78 contains first degassing section 20 and a second tank 80 contains second degassing section 22. First tank 78 includes a first degassing section 20 which includes a raw sulfur inlet line 26 which includes a heat exchanger 27, an eductor 28 for the admission of a degassed sulfur stream supplied via a line 30' which is ejected through eductor 28 to draw raw sulfur into eductor 28 and eject a mixture of raw sulfur, degassed sulfur and air into first section 20. A suitable oxidizing gas, such as air, is injected through a line 50, which may include a heat exchanger 51, and may be mixed with the degassed sulfur in line 30' as shown in first section 20. It will be understood that the gas may be introduced into eductors 28 and 50 in second section 22 by releasing the gas in the vicinity of the eductor eduction inlet or by introducing it directly into the line supplying the degassed sulfur to the nozzles. Tank 78 also includes a head space 96 and, as shown, includes a mist elimination device 84 to prevent the entrainment of liquid from tank 78. A hydrogen sulfide stream is withdrawn through a line 72 and passed to further treatment.

Second vessel 80 comprises second stage section 22 and includes eductor 56 which operates as discussed in conjunction with first section 20. Partially degassed sulfur flows from first section 20 in tank 78 to an inlet to tank 80 via a line 102. Line 102 is positioned to transfer sulfur when the sulfur level 98 in tank 78 rises to a suitable level. The level in tank 80 may be regulated by the amount of sulfur recycled through line 30 and by the amount of sulfur withdrawn as a product through a line 38. In eductor 56, as shown, the partially degassed molten sulfur is mixed with the degassed sulfur in line 30" directly. Either the partially degassed liquid sulfur or the air may be introduced into eductor 56 by releasing the material in the vicinity of the eduction inlets to the eductor or by passing it to the line passing the degassed sulfur stream in line 30" into the eductor to create the suction effect. Vessel 80 also includes a head space 96 and a mist elimination device 84 with a hydrogen sulfide-containing stream being removed through a line 72'.

The operation of the process in the vessel shown in FIG. 3 is as described in conjunction with FIG. 2 except that the partially degassed sulfur is transferred to second degassing section 22 via an overhead line rather than by an underflow line.

While reference has been made to the recovery of a hydrogen sulfide stream from the head space in the various degassing and sulfur storage sections, it should be understood that, by the operation of the present process, much of the hydrogen sulfide may be converted to sulfur and water during the treatment process. Accordingly, the stream recovered may contain relatively minor quantities of hydrogen sulfide. Nevertheless, it is contemplated that this stream will be passed to sulfur recovery, further treatment or the like.

In FIG. 4, an embodiment of an eductor useful in the method and apparatus of the present invention is shown. A line 30 supplies a material such as degassed molten sulfur to eductor 28 which, as shown, includes an outer nozzle 86 through which the stream flowing in line 30 is discharged. As this stream is discharged, materials are drawn into an open end 88 of eductor 28, as shown by arrows 90. Raw molten sulfur, gas and other fluid materials are drawn in as a result of the discharge of the flowing stream in line 30 through nozzle 86. As the fluid materials flow in, as shown by arrows 90 and mix with the stream flowing through line 30, a mixture is produced which is discharged through a discharge end 92 of nozzle 28, as shown by arrows 94. The use of such eductors is well known to those skilled in the art and will not be discussed further.

By the method of the present invention, degassed molten sulfur is mixed with the raw sulfur to achieve desired temperature control and to achieve desired intimate mixing and turbulence in the degassing zones. The use of the gas spargers in first section 20 and second section 22, as shown in FIG. 1, is considered desirable since the mixed stream of degassed sulfur and raw sulfur is ejected over the sparger so that the mixture is exposed to intimate contact with finely dispersed bubbles of a treating gas. In other embodiments, the treating gas is mixed with the molten sulfur in slightly different fashions, but in all embodiments the raw molten sulfur containing hydrogen sulfide and hydrogen polysulfides is mixed with molten sulfur and a suitable oxidizing gas, such as air, to result in vigorous mixture of the molten sulfur and the raw sulfur in the presence of finely dispersed oxidizing gas to result in conversion of the hydrogen sulfide and hydrogen polysulfide to either gaseous hydrogen sulfide or sulfur and water. As mentioned previously, this reaction is effective to strip hydrogen sulfide from liquid sulfur and, either directly or indirectly, oxidize a portion of the hydrogen sulfide and hydrogen polysulfide to elemental sulfur. The contacting is desirably at a temperature from about 245 to about 315° F. and desirably the sparging gas is air which is typically used in an amount equal to from about 30 to about 120 volumes per volume of raw molten sulfur. The residence time of the raw molten sulfur in first treating section 20 and second treating section 22 is selected to produce sulfur having a hydrogen sulfide content below a selected level. The residence time can be varied as known to those skilled in the art to accomplish a desired amount of hydrogen sulfide removal. Desirably, hydrogen sulfide is removed to produce a liquid sulfur product containing no more than about 10 to about 15 ppmw of $H_2S$. The use of a degassed sulfur storage section 16 in FIG. 1 permits the release of additional hydrogen sulfide from degassed sulfur prior to cooling. Neither of the embodiments shown in FIGS. 2 or 3 provide a sulfur storage area. However, it is considered that these embodiments are effective, especially with the use of suitable residence times. The apparatus disclosed is effective to achieve very effective and very complete mixing of both the raw sulfur and the degassed sulfur and intimate contact of the resulting mixture of these two materials with air or other oxidizing gas. As a result, the apparatus of the present invention provides a relatively simple and very effective method for degassing molten sulfur.

Having thus described the present invention by reference to its preferred embodiments, it is respectfully pointed out that the embodiments described above are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for removing hydrogen sulfide from a molten sulfur stream containing at least one of hydrogen sulfide and hydrogen polysulfides, the method consisting essentially of:
   a) mixing the molten sulfur stream with a degassed molten sulfur having a reduced hydrogen sulfide content in an eductor to form a mixture;
   b) supplying a gaseous oxidant in the immediate vicinity of the eductor, at least a portion of the gaseous oxidant passing through the eductor;
   c) separating hydrogen sulfide from the mixture; and
   d) recovering molten sulfur having a reduced hydrogen sulfide content.

2. The method of claim 1 wherein the mixture is at a temperature from about 245 to about 315° F.

3. The method of claim 1 wherein the oxidant is selected from the group consisting of oxygen-enriched air, sulfur dioxide and air.

4. The method of claim 3 wherein air is supplied at a rate of from about 30 to about 120 volumes per volume of the molten sulfur stream.

5. The method of claim 1 wherein the gaseous oxidant is supplied as a finely dispersed gaseous oxidant.

6. The method of claim 1 wherein the gaseous oxidant is supplied through a sparger.

7. The method of claim 1 wherein the product molten sulfur having a reduced hydrogen sulfide content has a hydrogen sulfide content below about 10 to about 15 ppmw.

8. A method for removing hydrogen sulfide from a molten sulfur stream containing at least one of hydrogen sulfide and hydrogen polysulfides, the method consisting essentially of:
 a) mixing the molten sulfur stream with a degassed molten sulfur having a reduced hydrogen sulfide content and an oxidant in an eductor in a first reaction zone to form a mixture;
 b) separating hydrogen sulfide from the mixture in the first reaction zone to produce a partially degassed molten sulfur;
 c) passing at least a portion of the partially degassed molten sulfur to a second reaction zone;
 d) mixing the partially degassed molten sulfur with a degassed molten sulfur and an oxidant in an eductor in the second reaction zone to produce a second mixture;
 e) separating hydrogen sulfide from the second mixture in the second reaction zone; and
 f) recovering molten sulfur having a reduced hydrogen sulfide content.

9. The method of claim 8 wherein the oxidant is selected from the group consisting of oxygen-enriched air, sulfur dioxide and air.

10. The method of claim 8 wherein the product molten sulfur having a reduced hydrogen sulfide content has a hydrogen sulfide content below about 10 to about 15 ppmw.

11. A method for removing hydrogen sulfide from a molten sulfur stream containing at least one of hydrogen sulfide and hydrogen polysulfides, the method consisting essentially of:
 a) mixing the molten sulfur stream with a degassed molten sulfur having a reduced sulfur content and an oxidant in an eductor to produce a mixture;
 b) separating hydrogen sulfide from the mixture; and
 c) recovering molten sulfur having a reduced hydrogen sulfide content.

12. The method of claim 11 wherein the oxidant is selected from the group consisting of oxygen-enriched air, sulfur dioxide and air.

13. The method of claim 11 wherein the product molten sulfur having a reduced hydrogen sulfide content has a hydrogen sulfide content below about 10 to about 15 ppmw.

* * * * *